(12) United States Patent
Huang et al.

(10) Patent No.: US 11,676,416 B1
(45) Date of Patent: Jun. 13, 2023

(54) OPTICAL IDENTIFICATION DEVICE

(71) Applicant: PixArt Imaging Inc., Hsin-Chu (TW)

(72) Inventors: Yong-Nong Huang, Hsin-Chu (TW); Hui-Hsuan Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/903,022

(22) Filed: Sep. 5, 2022

(51) Int. Cl.
  *G06V 40/13* (2022.01)
  *G06V 40/12* (2022.01)

(52) U.S. Cl.
  CPC ...... *G06V 40/1324* (2022.01); *G06V 40/1341* (2022.01)

(58) Field of Classification Search
  CPC .......... G06V 40/1324; G06V 40/1341
  See application file for complete search history.

(56) References Cited

U.S. PATENT DOCUMENTS

| | | | |
|---|---|---|---|
| 7,366,331 B2 | 4/2008 | Higuchi | |
| 8,259,168 B2 | 9/2012 | Wu | |
| 9,194,740 B2 | 11/2015 | Gu | |
| 10,019,615 B2 | 7/2018 | Wu | |
| 10,984,213 B2 | 4/2021 | He | |
| 11,030,434 B2 | 6/2021 | He | |
| 11,075,250 B2 | 7/2021 | Lee | |
| 2003/0103686 A1* | 6/2003 | Ogura | G06V 40/13 382/321 |
| 2013/0044282 A1* | 2/2013 | Kuwabara | B32B 17/08 313/504 |
| 2020/0342197 A1 | 10/2020 | Du | |
| 2021/0063816 A1* | 3/2021 | He | G06V 10/17 |

FOREIGN PATENT DOCUMENTS

| | | |
|---|---|---|
| EP | 1271389 | 1/2003 |
| WO | 2008/026169 | 3/2008 |

\* cited by examiner

*Primary Examiner* — Abhishek Sarma
(74) *Attorney, Agent, or Firm* — Winston Hsu

(57) ABSTRACT

An optical identification device includes a circuit board, a top cover, an optical detection module and an optical channel. The top cover is disposed on the circuit board and has an identification region. The optical detection module is disposed on the circuit board and located inside the top cover. The optical detection module includes an optical emitter and an optical receiver. The optical emitter is adapted to emit an illumination beam toward the top cover. The optical receiver is adapted to receive the illumination beam reflected from the top cover. The optical channel is disposed between the optical emitter and the top cover, and adapted to block the illumination beam from projecting onto a lower surface of the identification region facing the optical receiver.

12 Claims, 6 Drawing Sheets

OPTICAL IDENTIFICATION DEVICE

BACKGROUND OF THE INVENTION

1. Field of the Invention

The present invention relates to an optical identification device, and more particularly, to an optical identification device of utilizing invisible light and acquiring a fingerprint pattern without unexpected dark regions.

2. Description of the Prior Art

A conventional optical fingerprint identification device includes a reflective-type optical fingerprint identification device and a transmissive-type optical fingerprint identification device. The reflective-type optical fingerprint identification device utilizes a visible beam to be an illumination light source, and a top cover of the reflective-type optical fingerprint identification device where the finger touches is made as a light color detection region, so that the visible beam passes through the top cover to generate the fingerprint image. The transmissive-type optical fingerprint identification device utilizes an invisible beam to be the illumination light source, but the invisible light source and the optical receiver are disposed on different sides of the target object; for example, if the finger pulp contacts the optical receiver, the invisible light source has to be set adjacent to the fingernail or the lateral side of the finger, so that the conventional transmissive-type optical fingerprint identification device has a large size. Therefore, design of an optical identification device capable of executing fingerprint identification via the invisible beam and having small size is an important issue in the optical detection industry.

SUMMARY OF THE INVENTION

The present invention provides an optical identification device of utilizing invisible light and acquiring a fingerprint pattern without unexpected dark regions for solving above drawbacks.

According to the claimed invention, an optical identification device includes a circuit board, a top cover, an optical detection module and an optical channel. The top cover is disposed on the circuit board and has an identification region. The optical detection module is disposed on the circuit board and located inside the top cover. The optical detection module includes an optical emitter and an optical receiver. The optical emitter is adapted to emit an illumination beam toward the top cover. The optical receiver is adapted to receive the illumination beam reflected from the top cover. The optical channel is disposed between the optical emitter and the top cover, and adapted to block the illumination beam from projecting onto a lower surface of the identification region facing the optical receiver.

According to the claimed invention, a height difference between position of the optical emitter and the optical receiver on the circuit board is smaller than a predefined range. A wavelength of the illumination beam emitted by the optical emitter is ranged between 700 nm~1800 nm.

According to the claimed invention, a target object contacts an upper surface of the identification region opposite to the optical receiver, and the optical channel blocks the illumination beam from projecting onto a lower surface of the top cover facing the optical detection module and adjacent to the identification region.

According to the claimed invention, the optical channel includes a first end and a second end opposite to each other, the first end points toward the optical emitter, and the second end abuts against a lower surface of the top cover facing the optical detection module. A radial dimension of the first end is different from a radial dimension of the second end.

According to the claimed invention, the optical identification device further includes an optical guiding component disposed adjacent to the second end and adapted to change a transmission path of the illumination beam. The optical guiding component is a prism or a light guide.

According to the claimed invention, an interval between the optical channel and a field of view of the optical receiver is smaller than a predefined value. The optical channel is a light guide or at least one side wall structure.

According to the claimed invention, the optical identification device further includes an anti-reflection component disposed on a lower surface of the top cover facing the optical detection module. The optical identification device further includes a protection component disposed on an upper surface of the top cover opposite to the optical detection module.

The optical identification device of the present invention can utilize the invisible light as the illumination beam of the optical detection module, and utilize the optical channel to block the illumination beam from projecting onto the identification region of the top cover. The optical channel can guide the illumination beam to directly pierce through the top cover for projecting onto the target object. The target object can be uniformly illuminated by the illumination beam, and the optical receiver can only receive the optical signals reflected or diffused by the target object from top to bottom. The optical transmission path between the target object and the optical receiver is not blocked by any element, so that the detection image acquired by the optical receiver does not have the unexpected dark regions. Besides, a surface of the target object may have unexpected substances, such as corneum on the finger, and the illuminated target object can provide an obvious path difference between one optical path from the sunken area of the fingerprint to the optical receiver and another optical path from the protruding area of the fingerprint to the optical receiver, therefore the optical receiver can still acquire the clear fingerprint image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
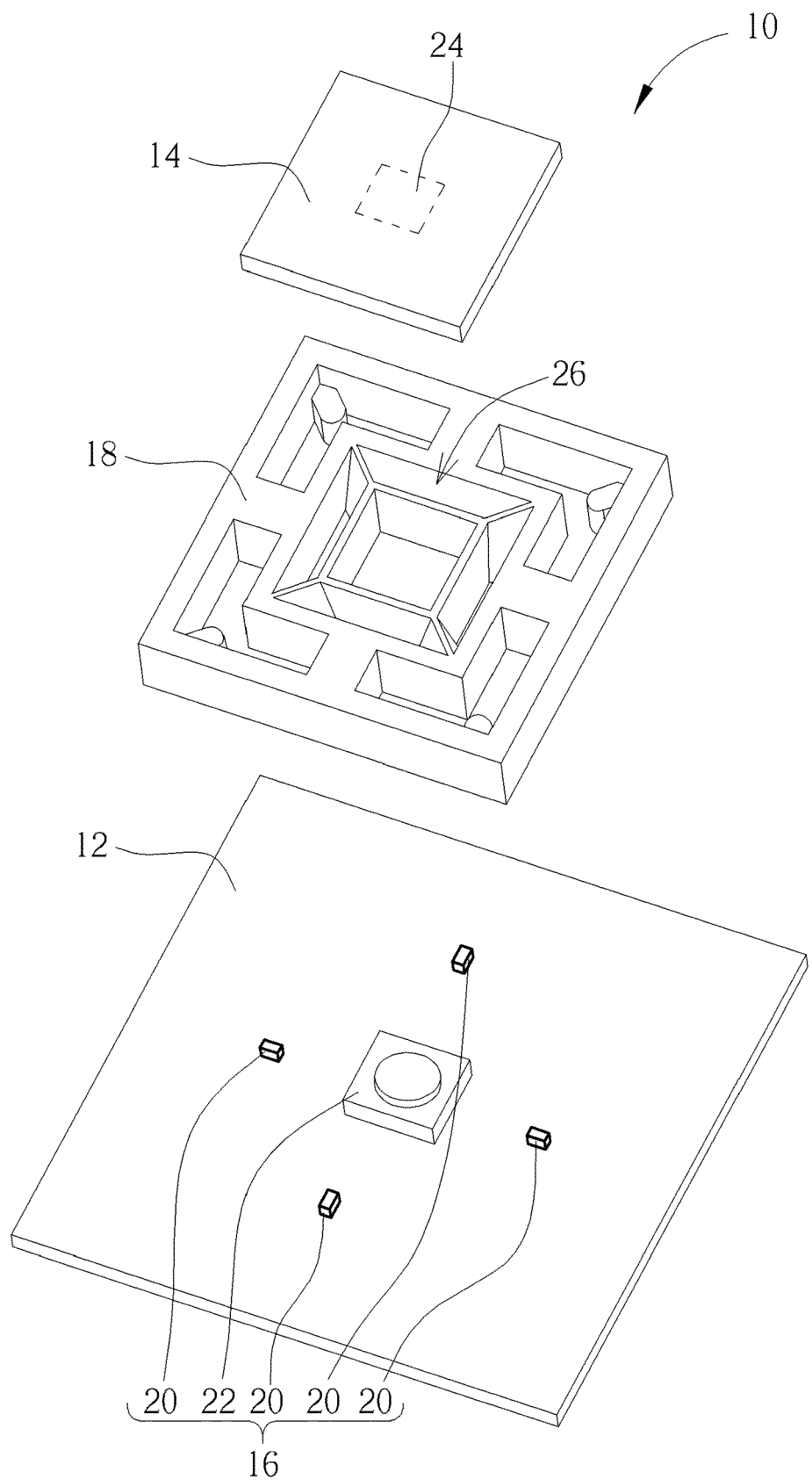
FIG. 1 is an exploded diagram of an optical identification device according to an embodiment of the present invention.
Figure 2:
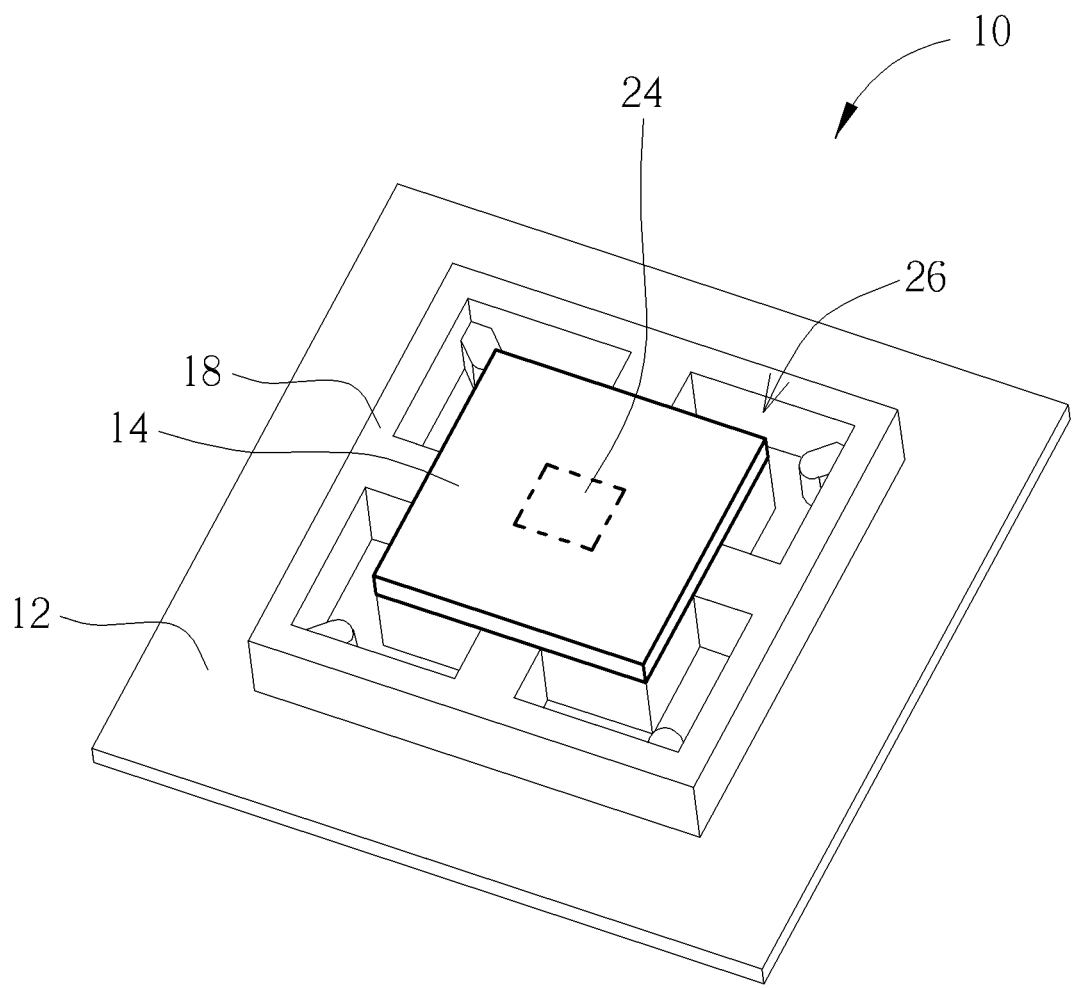
FIG. 2 is an assembly diagram of the optical identification device according to the embodiment of the present invention.

Please refer to FIG. 1 and FIG. 2. FIG. 1 is an exploded diagram of an optical identification device 10 according to an embodiment of the present invention. FIG. 2 is an assembly diagram of the optical identification device 10 according to the embodiment of the present invention. The optical identification device 10 can include a circuit board 12, a top cover 14, an optical detection module 16 and a supporter 18. The circuit board 12 can be disposed inside a case of the optical identification device 10. The optical detection module 16 can include several optical emitters 20 and at least one optical receiver 22 disposed on the circuit board 12. In the embodiment, four optical emitters 20 are respectively disposed on each side of the optical receiver 22; a number and arrangement of the optical emitter 20 and the optical receiver 22 are not limited to the embodiment, and depend on a design demand. The supporter 18 can be disposed on the circuit board 12 to surround the optical detection module 16. The top cover 14 can be installed on top of the supporter 18 so as to locate on the circuit board 12. A part of the top cover 14 can be defined as an identification region 24. A target object Ot can contact the identification region 24 and therefore the optical detection module 16 can acquire a detection image relevant to the target object Ot.

Figure 3:
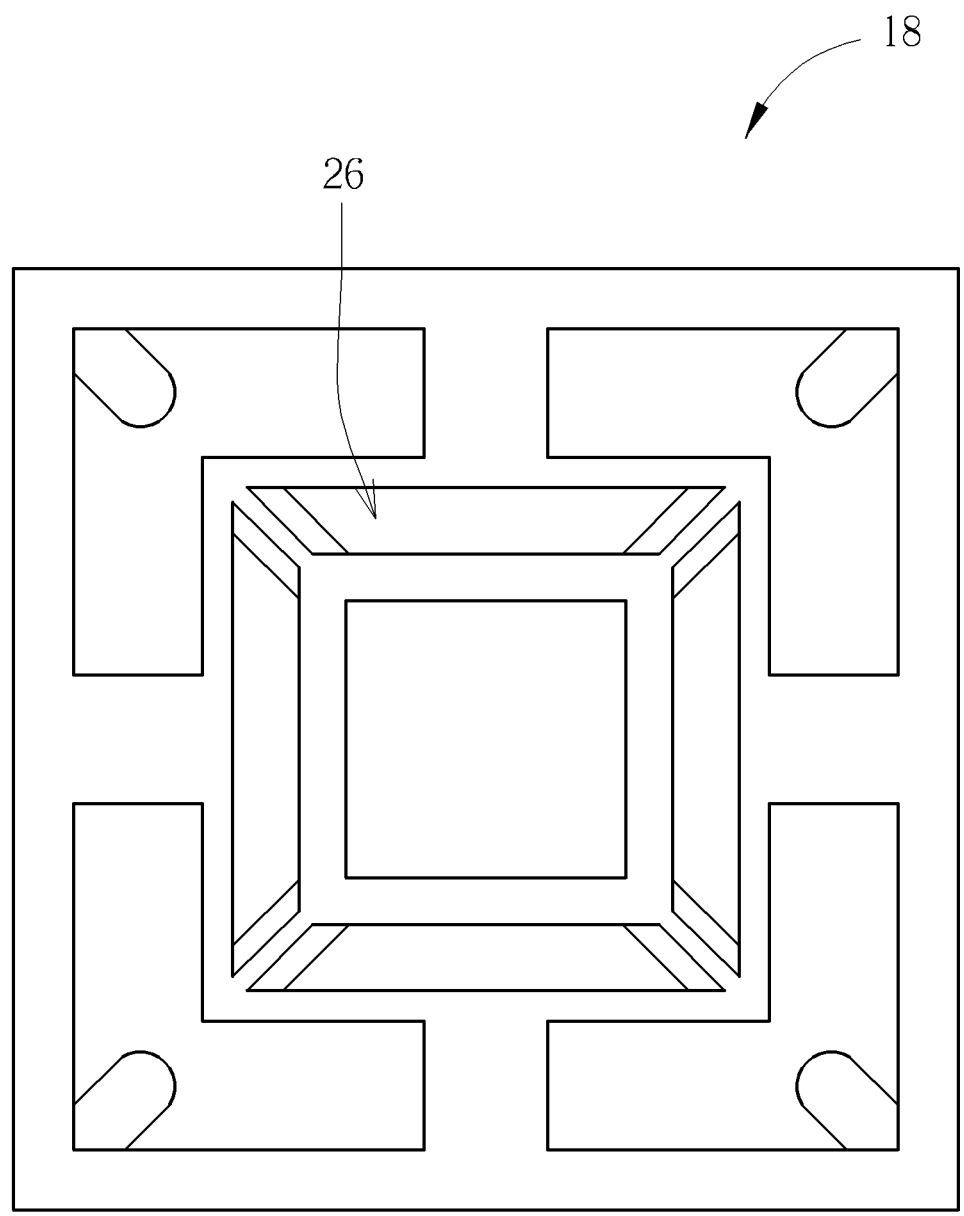
FIG. 3 is a top view of a supporter according to a first embodiment of the present invention.
Figure 4:
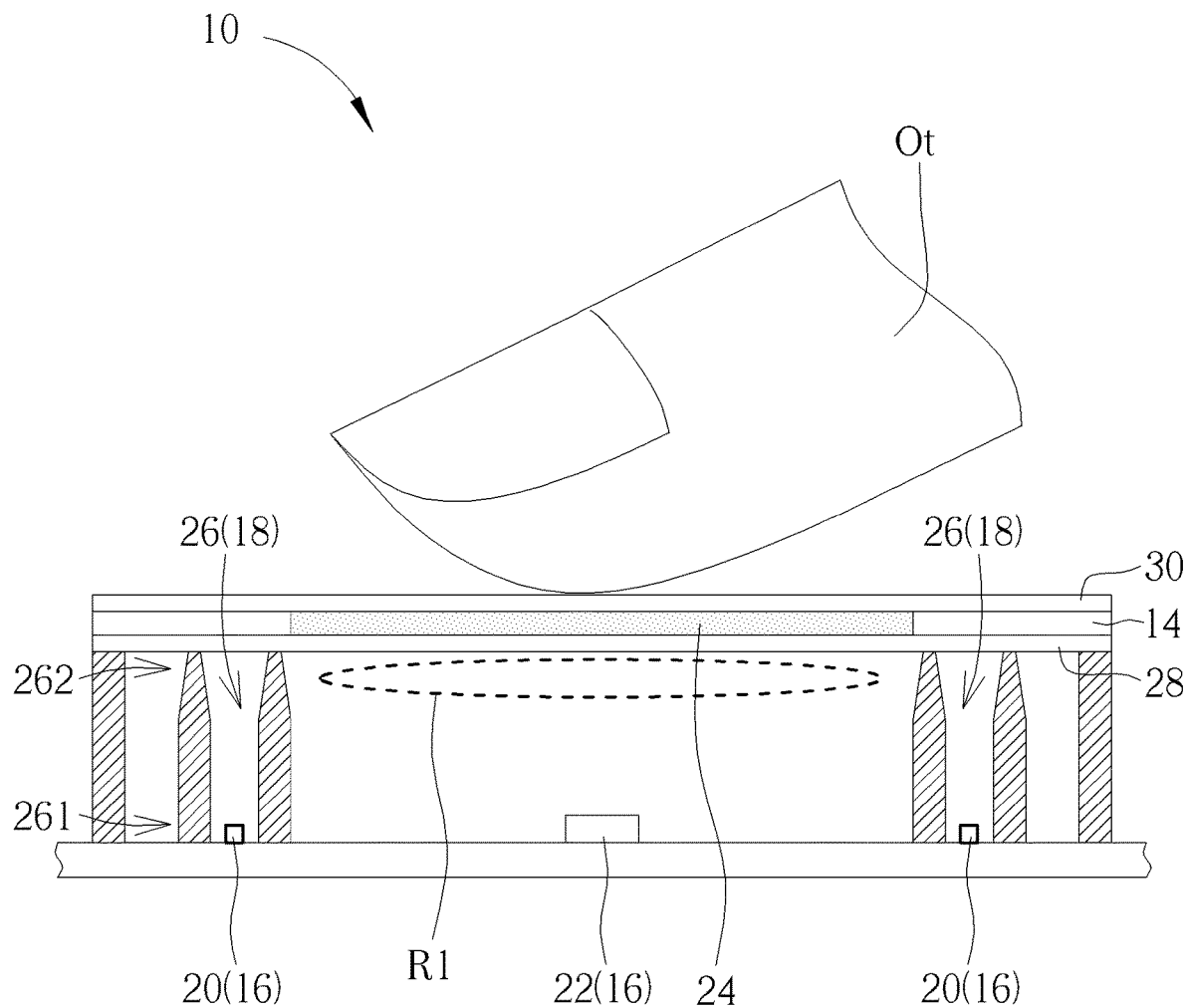
FIG. 4 is a sectional view of the optical identification device according to the first embodiment of the present invention.

Please refer to FIG. 1 to FIG. 4. FIG. 3 is a top view of the supporter 18 according to a first embodiment of the present invention. FIG. 4 is a sectional view of the optical identification device 10 according to the first embodiment of the present invention. The supporter 18 can include an optical channel 26 and several structural components (which are not marked in the figures). The structural components can be disposed around the optical channel 26 for fixing the optical channel 26 and convenient manufacturing process. The optical channel 26 can be disposed between the optical emitter 20 and the top cover 14. The optical emitter 20 may be installed inside the optical channel 26, and can emit an illumination beam upwardly along the optical channel 26. When the target object Ot contacts the upper surface of the identification region 24 opposite to the optical receiver 20, the optical channel 26 can guide the illumination beam emitted by the optical emitter 20 to directly pierce through the top cover 14 and project onto the target object Ot, such as piercing into skin of the user's finger. The target object Ot can be illuminated by the illumination beam, and the optical receiver 22 can receive optical signals from the illuminated target object Ot for acquiring the detection image.

It should be mentioned that the optical channel 26 can have a first end 261 and a second end 262 opposite to each other. The first end 261 can point toward the optical emitter 20. The second end 262 can abut against the lower surface of the top cover 14 facing the optical detection module 16. In the first embodiment, the optical channel 26 can be designed as at least one side wall structure with a hollow tube. The first end 261 of the side wall structure can cover the optical emitter 20, which means the optical emitter 20 is located inside the hollow tube. The second end 262 of the side wall structure can preferably abut against the top cover 14, or can be adhered to the top cover 14. Therefore, the optical channel 26 can prevent the illumination beam of the optical emitter 20 from being projected onto the lower surface of the identification region 24 facing the optical receiver 20, such as a region R1 shown in FIG. 4, and the illumination beam cannot be directly received by the optical receiver 22 through a cavity between the circuit board 12 and the top cover 14.

The optical identification device 10 can utilize the optical channel 26 to guide the illumination beam of the optical emitter 20 to be directly and completely projected onto the target object Ot. The target object Ot can be illuminated by the illumination beam and emit light outwardly. If the target object Ot is the user's finger, an optical path from a sunken area of the fingerprint to the optical receiver 22 can be different from an optical path from a protruding area of the fingerprint to the optical receiver 22, and there has no element located between the target object Ot and the optical receiver 22, so that the detection image relevant to the target object Ot and acquired by the optical receiver 22 can be a clear fingerprint image without unexpected dark regions. Accordingly, the optical identification device 10 can preferably set invisible light as a light source of the optical emitter 20, and the invisible light can have a wavelength ranged between 700 nm~1800 nm so as to pierce into the human body and then be received by the optical receiver 22. The optical identification device 10 may optionally utilize infrared light to be the light source of the optical emitter 20, and the infrared light having a wave crest equal to 940 nm can provide the uniform and clear fingerprint image better than the infrared light having the wave crest equal to 850 nm.

In addition, a height difference between position of the optical emitter 20 and the optical receiver 22 on the circuit board 12 can be smaller than a predefined range, which means the optical emitter 20 and the optical receiver 22 can be preferably disposed on the same circuit board 12 for minimizing the optical identification device 10. The illumination beam of the optical emitter 20 can be guided to directly project onto the target object Ot, and an interval between the optical channel 26 and a field of view of the optical receiver 22 can be smaller than a predefined value, which means the side wall structure of the optical channel 26 can be close to the field of view of the optical receiver 22 for further minimizing the optical identification device 10. Actual numbers of the predefined range and the predefined value can be set in accordance with the design demand. Besides, a radial dimension of the hollow tube within the optical channel 26 can be changed in accordance with an actual demand. As shown in FIG. 4, the radial dimension of the first end 261 can be smaller than the radial dimension of the second end 262, so that the illumination beam can be dispersedly projected onto and uniformly absorbed by the target object Ot, so as to improve power consumption of the optical emitter 20. Moreover, the radial dimension of the first end 261 may be the same as or smaller than the radial dimension of the second end 262, or a radial dimension of a middle area between the first end 261 and the second end 262 can be changed. Any optical component capable of guiding the illumination beam to uniformly project onto the target object Ot can belongs to a design scope of the optical channel 26 in the present invention For increasing an identification accuracy of the optical identification device 10, the optical identification device 10 can optionally include at least one of an anti-reflection component 28 and a protection component 30. A refractive index of the anti-reflection component 28 can be smaller than a refractive index of the top cover 14; for example, the refractive index of the anti-reflection component 28 may be set as 1.225 due to its material property, which depends on the actual demand. The anti-reflection component 28 can be disposed on the lower surface of the top cover 14 facing the optical detection module 16, and used to increase a piercing rate of the illumination beam. The protection component 30 can be made by solid material, and disposed on the upper surface of the top cover 14 opposite to the optical detection module 16. The protection component 30 can avoid the optical identification device 10 from attrition. The refractive index of the protection component 30 may be set as 1.4, or ranged between 1.42.5. The refractive index of the protection component 30 can be similar to the refractive index of the target object Ot, so that the optical receiver 22 can receive the optical signals from the uniformly illuminated target object Ot and acquire the clear fingerprint image.

Figure 5:
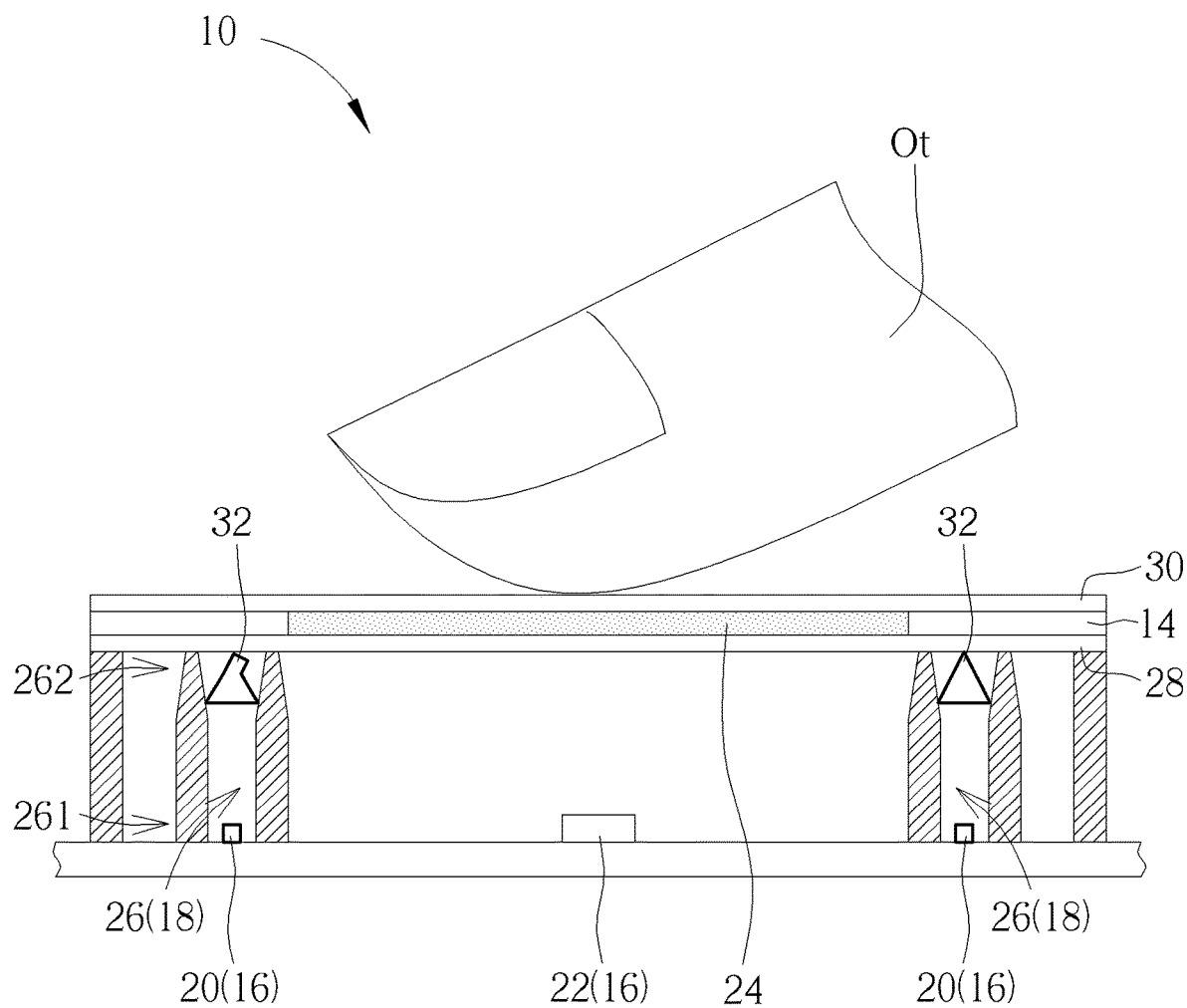
FIG. 5 is a sectional view of the optical identification device in another type according to the first embodiment of the present invention.

Please refer to FIG. 5. FIG. 5 is a sectional view of the optical identification device 10 in another type according to the first embodiment of the present invention. The optical identification device 10 can optionally include an optical guiding component 32 disposed on position adjacent to the second end 262, and used to change an optical transmission path of the illumination beam. The radial dimension of the second end 262 can be greater than the radial dimension of the first end 261, so that the illumination beam maybe scattered at the second end 262, and the optical guiding component 32 disposed on the second end 262 can guide the illumination beam to accurately project onto the demanded position, such as a center of the target object Ot, for increasing the identification accuracy of the optical identification device 10. The optical guiding component 32 can be a prism or a light guide. Any optical element capable of changing the optical transmission path can belong to a design scope of the optical guiding component 32 in the present invention.

Figure 6:
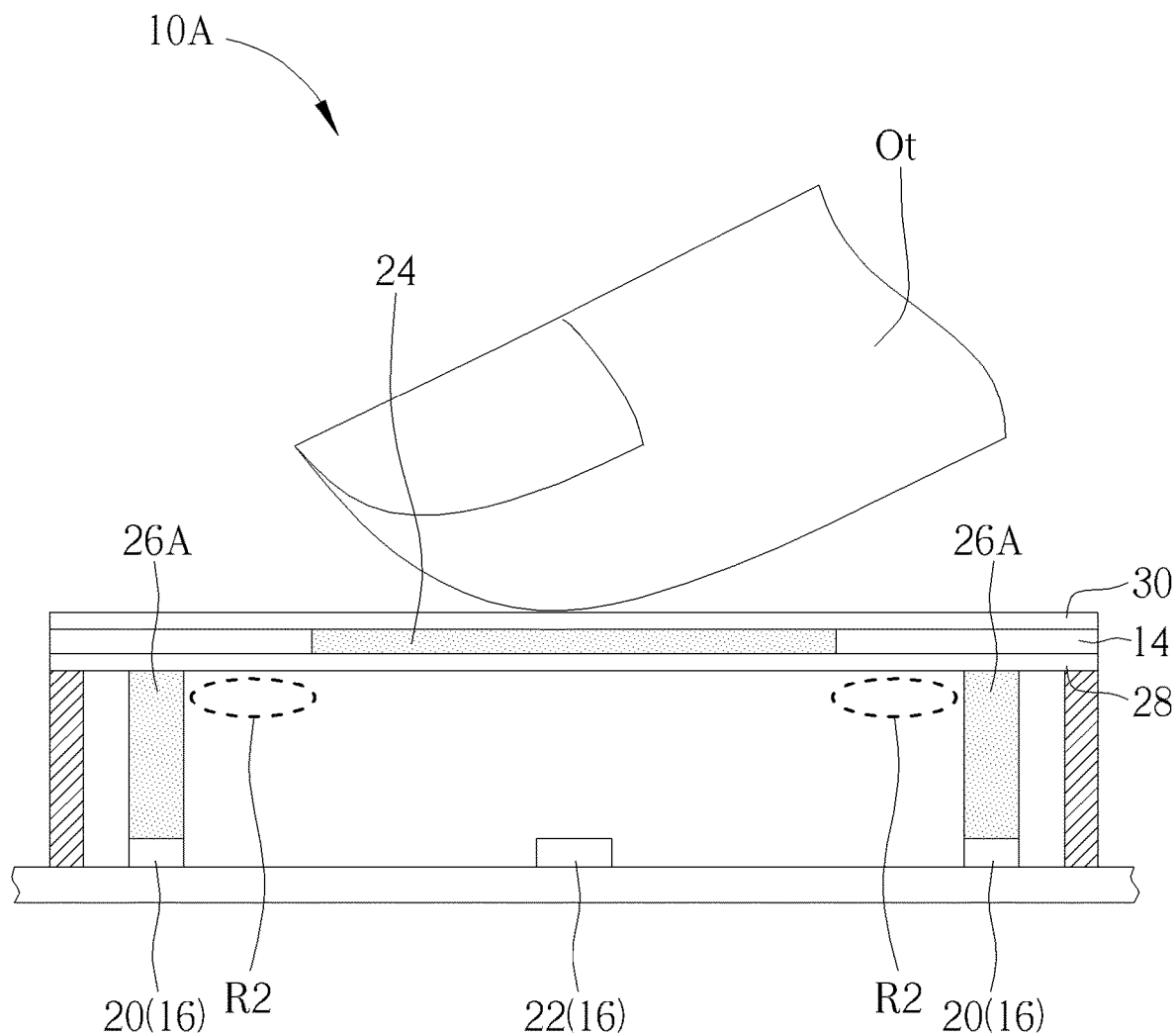
FIG. 6 is a sectional view of the optical identification device according to a second embodiment of the present invention.

Please refer to FIG. 6. FIG. 6 is a sectional view of the optical identification device 10A according to a second embodiment of the present invention. In the second embodiment, elements having the same numerals as ones of the first embodiment have the same structures and functions, and a detailed description is omitted herein for simplicity. The optical identification device 10A can include the optical channel 26A designed as a light pipe, which is used to guide the illumination beam of the optical emitter 20 to directly project onto the target object Ot for absorption, and further to prevent the illumination beam from projecting onto the lower surface of the identification region 24 facing the optical emitter 20, such as the region R1 shown in FIG. 4. In some possible embodiments, the second end 262 of the optical channel 26 (or the optical channel 26A) may be slightly spaced from the identification region 24, or the second end 262 may be slightly spaced from a field of view of the optical receiver 22, and the optical channel 26 (or the optical channel 26A) can tightly abut against the top cover 14 to block the illumination beam from projecting onto the lower surface of the top cover 14 facing the optical detection module 16 and adjacent to the identification region 24, such as the region R2 shown in FIG. 6.

In conclusion, the optical identification device of the present invention can utilize the invisible light as the illumination beam of the optical detection module, and utilize the optical channel to block the illumination beam from projecting onto the identification region of the top cover. The optical channel can guide the illumination beam to directly pierce through the top cover for projecting onto the target object. The optical channel can be a chamber formed by surrounding material, such as the hollow tube between the side wall structures; the illumination beam can be guided to transit along a specific direction via difference in the refractive index of the side wall structure and the refractive index of the air. Besides, the optical channel may be a light guiding component made by solid material, such as the light pipe or any optical component with similar functions. The target object can be uniformly illuminated by the illumination beam, and the optical receiver can only receive the optical signals reflected or diffused by the target object from top to bottom. The optical transmission path between the target object and the optical receiver is not blocked by any element, so that the detection image acquired by the optical receiver does not have the unexpected dark regions. Besides, a surface of the target object may have unexpected substances, such as corneum on the finger, and the illuminated target object can provide an obvious path difference between one optical path from the sunken area of the fingerprint to the optical receiver and another optical path from the protruding area of the fingerprint to the optical receiver, therefore the optical receiver can still acquire the clear fingerprint image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical identification device, comprising:
   a circuit board;
   a top cover disposed on the circuit board, the top cover having an identification region;
   an optical detection module disposed on the circuit board and located inside the top cover, the optical detection module comprising:
     an optical emitter facing an area of the top cover extending from the identification region, and adapted to emit an illumination beam toward the top cover; and
     an optical receiver adapted to receive the illumination beam reflected from the top cover; and
   an optical channel disposed between the optical emitter and the top cover, and adapted to guide the illumination beam toward the foresaid area and further to block the illumination beam from projecting onto a lower surface of the identification region facing the optical receiver.

2. The optical identification device of claim 1, wherein a height difference between position of the optical emitter and the optical receiver on the circuit board is smaller than a predefined range.

3. The optical identification device of claim 1, wherein a wavelength of the illumination beam emitted by the optical emitter is ranged between 700 nm~1800 nm.

4. The optical identification device of claim 1, wherein a target object contacts an upper surface of the identification region opposite to the optical receiver, and the optical channel blocks the illumination beam from projecting onto a lower surface of the top cover facing the optical detection module and adjacent to the identification region.

5. The optical identification device of claim 1, wherein the optical channel comprises a first end and a second end opposite to each other, the first end points toward the optical emitter, and the second end abuts against a lower surface of the top cover facing the optical detection module.

6. The optical identification device of claim 5, wherein a radial dimension of the first end is different from a radial dimension of the second end.

7. The optical identification device of claim 5, wherein the optical identification device further comprises an optical guiding component disposed adjacent to the second end and adapted to change a transmission path of the illumination beam.

8. The optical identification device of claim 7, wherein the optical guiding component is a prism or a light guide.

9. The optical identification device of claim 1, wherein an interval between the optical channel and a field of view of the optical receiver is smaller than a predefined value.

10. The optical identification device of claim 1, wherein the optical channel is a light guide or at least one side wall structure.

11. The optical identification device of claim 1, wherein the optical identification device further comprises an anti-reflection component disposed on a lower surface of the top cover facing the optical detection module.

12. The optical identification device of claim 1, wherein the optical identification device further comprises a protection component disposed on an upper surface of the top cover opposite to the optical detection module.

\* \* \* \* \*